United States Patent Office 3,517,554
Patented June 30, 1970

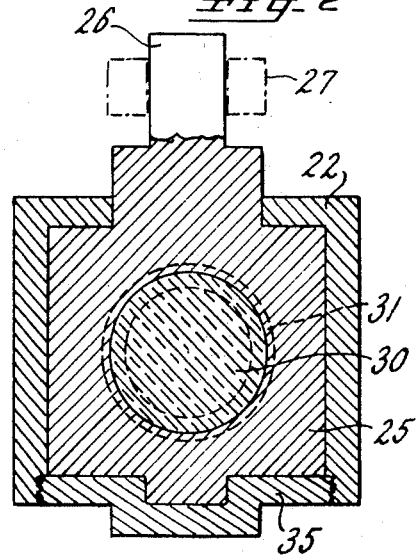
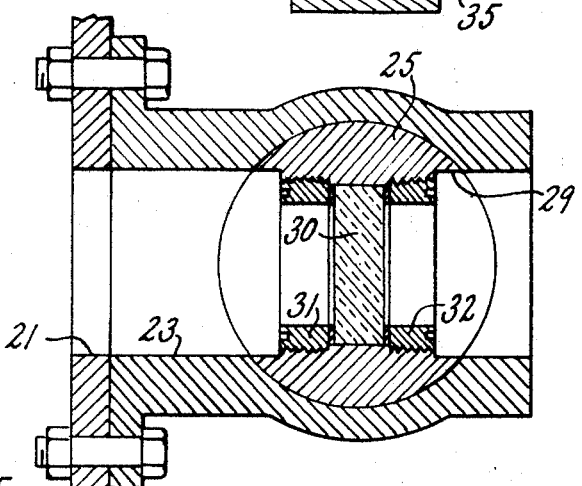
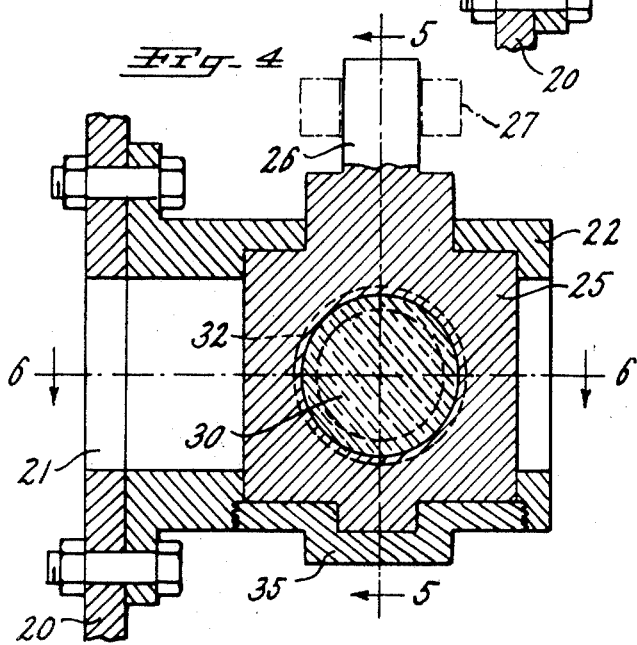

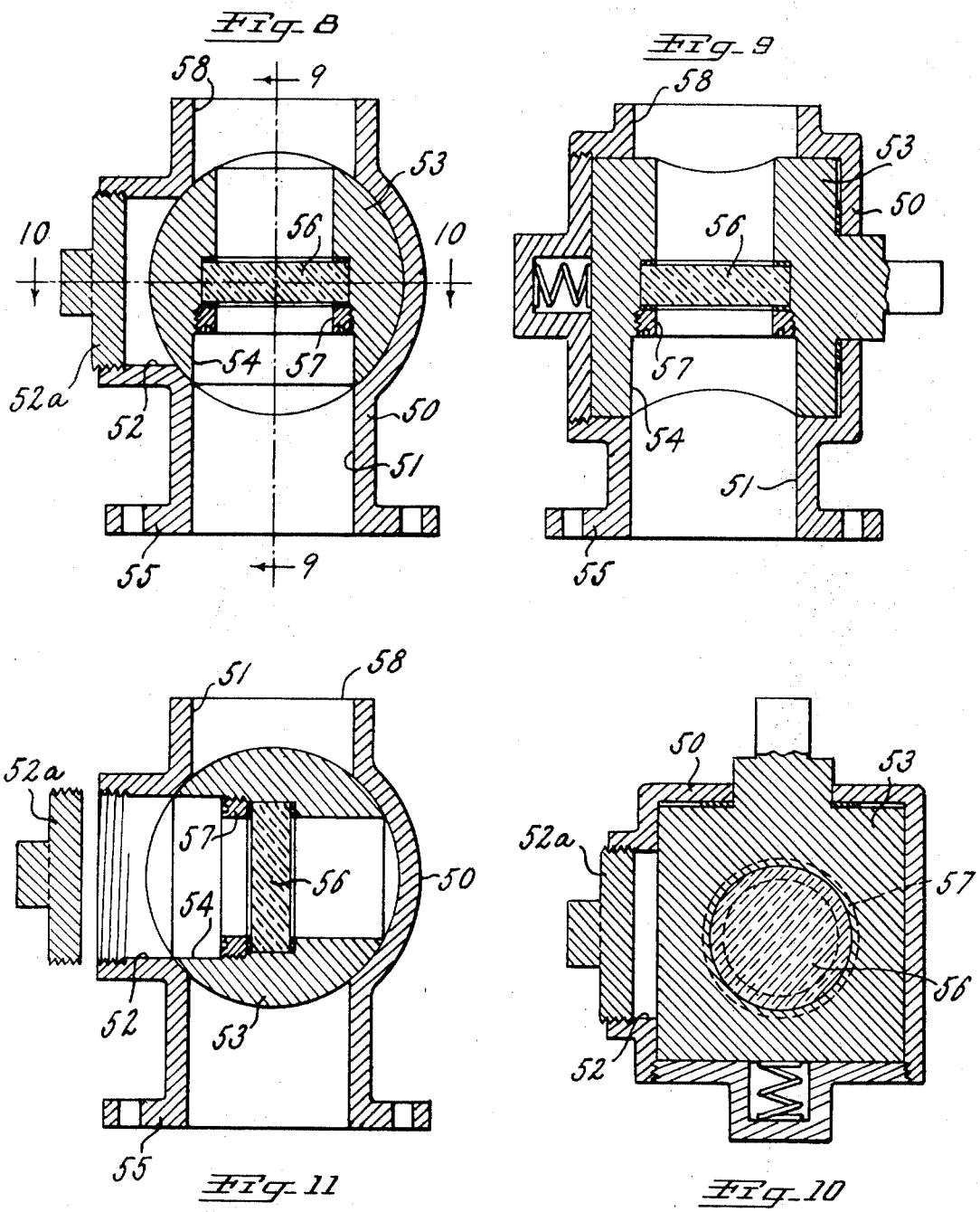

3,517,554
SAFETY SIGHT GLASS
Andrew M. Smith, Baton Rouge, La., assignor to Uniroyal, Inc., New York, N.Y., a corporation of New Jersey
Filed May 20, 1968, Ser. No. 730,492
Int. Cl. G01f 23/02
U.S. Cl. 73—332     4 Claims

ABSTRACT OF THE DISCLOSURE

A safety sight glass for looking into a vessel or the like while it is under pressure is basically a plug valve with a sight glass mounted in the port of the plug. When the plug is in an "open" position the sight glass permits looking into the vessel; when the plug is rotated to a "closed" position, the glass is sealed off from the vessel. In the event of accidental breakage of the glass the plug can be rotated quickly to a "closed" position, thus preventing the contents of the vessel from rushing out.

BACKGROUND OF THE INVENTION

Field of the invention

This invention relates to a safety sight glass assembly.

Description of the prior art

Sight glasses for looking into pressure vessels, pipes, or the like, while in operation are of course well known. Occasionally a sight glass will break, causing not only loss of the contents of the vessel or the like, but sometimes injuring or killing workmen if the contents are at high temperature or caustic or toxic; damage to the surroundings can also be extensive; fire or explosion hazard is presented if the contents are inflammable or explosive. While various improved sight glass arrangements have been proposed (e.g., U.S. Pats. 2,217,958, Long, Oct. 15, 1940; 2,543,107, Haatvedt, Feb. 27, 1951; 2,686,611, Burke, Aug. 17, 1954; 3,125,882, Johnson et al., Mar. 24, 1964) these have not, in general, afforded the advantage of a simple structure which would permit sealing off the sight opening quickly and positively in the event of breakage of the glass, while permitting cleaning of either side of the glass without breaking the hermetic seal of the vessel, or, if desired, actually replacing the glass without loss of pressure.

SUMMARY OF THE INVENTION

The sight glass assembly of the invention may be described as essentially a plug valve with a sight glass mounted in the port of the plug. When the rotatable plug is in an "open" position, there is a clear line of sight into the vessel or the like on which the valve body is mounted. Simply rotating the plug 90° to a "closed" position, in the event of breakage of the glass for example, immediately seals off the glass and the port of the plug from the interior of the vessel. Rotation of the plug 180° from the first-mentioned "open" position puts the plug in a new "open" position in which the face of the glass that formerly was on the inside is now on the outside, so that it is accessible for cleaning. In a modification of the invention, the valve may be of the "three-way" style, that is, the valve passageway may be T-shaped, with a side opening or passageway at right angles to the straight-through line of sight passageway. Rotation of the plug so as to present the sight glass to this side opening permits the glass (which is removably mounted in the plug) to be changed, without breaking the seal to the vessel.

DESCRIPTION OF THE DRAWING

The invention will be described in detail with reference to the accompanying drawings, wherein:

FIG. 1 is a longitudinal sectional elevational view of a sight glass assembly of the invention mounted on a vessel (only a fragment of the vessel is shown) in an "open" position;

FIG. 2 is a transverse sectional elevational view taken along the line 2—2 of FIG. 1;

FIG. 3 is a longitudinal sectional plan view taken along the line 3—3 of FIG. 1;

FIG. 4 is a view similar to FIG. 1, showing the sight glass rotated 90° from its position in FIG. 1 to a "closed" position;

FIG. 8 is a longitudinal sectional view of a modification of the invention, showing a sight glass in an "open" position;

FIG. 9 is a longitudinal sectional view along the line 9—9 of FIG. 8;

FIG. 10 is a transverse sectional view along the line 10—10 of FIG. 8; and

FIG. 11 is a view similor to FIG. 8, showing the sight glass rotated 90° to a position suitable for removal of the glass.

DESCRIPTION OF PREFERRED EMBODIMENTS

Figure 5:
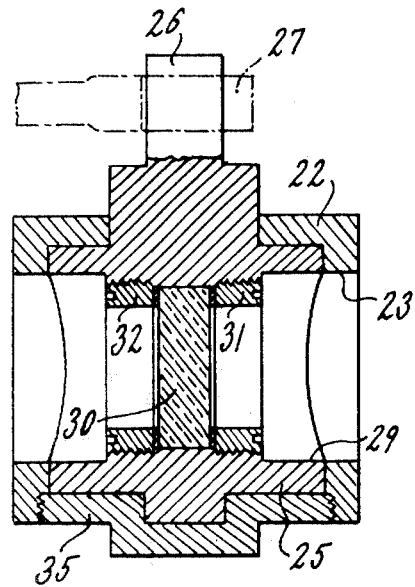
FIG. 5 is a transverse sectional elevational view taken along the line 5—5 of FIG. 4.

Referring to the drawing, and in particular to FIGS. 1–7, the sight glass assembly of the invention is shown mounted on the wall of a pressure vessel 20 or the like at a circular opening 21 of such vessel. The sight glass assembly includes a body 22, which may be constructed similarly to a conventional plug valve body, and which has a longitudinal cylindrical passageway 23 extending therethrough in alignment with the opening 21 of the vessel 20. A cylindrical plug 25 is rotatably mounted transversely of the passageway 23, in closely-fitting (fluid-sealing) frictional engagement with the valve body 22, suitably in the same manner that the plug of a conventional plug valve is mounted for fluid-sealing rotation in an ordinary plug valve construction. A portion of the plug projecting through the valve body to the exterior is suitably provided with a stem 26 for engagement by a wrench 27 or the like for convenience in rotating the plug. The plug has a transverse cylindrical port 29 extending therethrough, which is in alignment with the longitudinal passageway 23 of the body 22 when the plug is in the "open" position as shown in FIG. 1. Disposed transversely across the plug port 29 and forming a barrier in such port there is a sight glass disk 30, made of glass or equivalent suitable transparent material, which may be held in place on either side by retaining rings 31, 32 threaded into the interior wall of the port. A removable cap 35 holds the plug firmly (but rotatably) in place within a correspondingly shaped closely fitting cylindrical recess 36 (FIG. 6) of the valve body while at the same time permitting easy assembly or disassembly for maintenance, e.g. lubrication or changing of packing or sealing rings (not shown), just as in a conventional plug valve.

In operation, when the sight glass is in the "open" position shown in FIGS. 1, 2 and 3 a clear line of sight is afforded from outside the assembly through the longitudinal passageway 23 of the valve body and the aligned port 29 of the plug, and through the opening 21 of the pressure vessel 20 to which the assembly is attached. To close off the sight glass, the plug 25 is simply rotated 90° in either direction within its cylindrical recess 36 (FIG. 6), for example with the aid of a wrench 27, to a "closed" position, represented by FIGS. 4, 5 and 6. In this position, the solid portion of the plug body 25 completely blocks off the longitudinal passageway 23, as is best seen in FIG. 6, so that the interior of the vessel remains sealed off, even if the sight glass 30 is broken.

Figure 6:
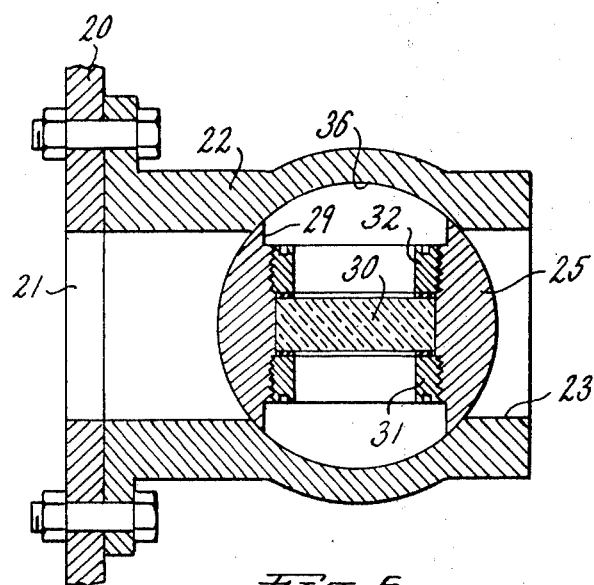
FIG. 6 is a longitudinal sectional plan view along the line 6—6 of FIG. 4.
Figure 7:
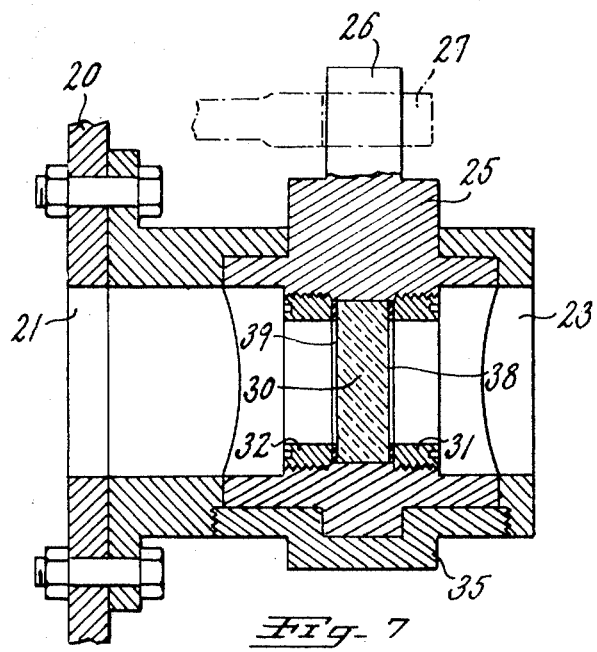
FIG. 7 is a view similar to FIG. 1 showing the sight glass rotated 180° from its position in FIG. 1 to an alternative "open" position.

Rotation of the plug 25 an additional 90° from the "closed" position represented in FIGS. 4, 5 and 6 (that is, a full 180° from the initial "open" position shown in FIGS. 1, 2 and 3) brings the sight glass 30 to a new "open" position, shown in FIG. 7, in which a side 38 of the glass 30 which was the "inside" face in FIGS. 1–3, that is, the side facing the vessel opening 21 in FIG. 1, now becomes the "outside" face in FIG. 7, while the side 39 of the glass which was initially the "outside" now faces (in FIG. 7) the vessel opening 21. This permits cleaning of the inside face of the glass. At any time that the face of the glass becomes soiled or obscured by splattering, foaming, or similar contact with the contents of the vessel, the glass can be cleaned simply by turning the plug a half turn (180°), thus bringing the soiled face of the glass to the outside where it is readily accessible for cleaning, without of course breaking the fluid-tight seal or otherwise disturbing the operation of the vessel.

It will be apparent from the foregoing that the invention provides a device allowing visual inspection of the interiors of tanks, vessels, bins, hoppers and other types of containers under conditions of pressure, vacuum or atmospheric pressure. The device can also be used to insert and and remove instruments (controlling, recording or indicating) or parts thereof. The device can also be used to insert materials into the vessels or containers and to remove materials from said vessels or containers. The device can replace the ordinary fixed glass or plastic windows in vessels or containers. The ability to rotate the glass in the device allows the cleaning of the underside of the glass. It also makes it possible to remove the glass from the force, actions, and pressures of the materials in the vessel. In the event the glass is broken or ruptured, the glass holder can be rotated 90° to stop the escape of the materials from the vessel.

The device can normally be left in the closed position with the glass not exposed to the contents of the vessel.

The device has 5 primary functions:

(1) The device provides a method of allowing a view into a vessel, container, etc. through a glass or plastic window with the safeguard of exposing the glass window to the actions of the materials in the vessel only during the period when such a view is necessary. It also allows a method to confine the materials in the vessel, etc. in the event of the failure, breakage or rupture of the glass, etc. window.

(2) The device provides a method of cleaning the glass, etc. window without removing the glass, etc. window or entering the vessel. The window can be rotated a full 360° to provide access to the "inside and outside" of the window from outside the vessel.

(3) Devices can be attached to a plate (metal) which will allow the insertion and removal of devices attached to the plate from the outside to the inside of the vessel and vice versa. A good example is the insertion and removal of thermocouples from vessels, furnaces, etc. for repair or replacement. The same applies to similar devices for the detection, etc. of temperature, pressure, etc. conditions inside the vessel.

(4) Sample containers can be attached to the plate and actuated inside the vessel for removing sample size quantities from the vessel at conditions truly representative of the actual material condition at the time the sample was taken. These sample containers under pressure can be removed from the plate for transportation and testing at the laboratory.

(5) The device can be used to permit a beam of light, etc. to enter the vessel. This beam of light can exit from the vessel via a second such device to actuate light sensitive instruments. This can be used to detect material levels, foam, smoke, vapors, etc.

The device is pressure and vacuum tight when in a static position. Rotation of the ported cylinder will allow an amount equal to the volume of the port (less the volume of the glass or plate and less the volume of the unexposed portion (outside of the port) to escape to atmosphere). (Amount lost will be one-half the volume of the port less one-half the volume of the glass or plate.) Losses can be greatly reduced by the use of contoured glasses or by contoured holding devices with a slot or small aperture for viewing.

Each totally enclosed vessel will require at least two of these sight glass devices. One for the entry of artificial light and the other for viewing into the vessel.

The device can also be used with a solid plate (metal or otherwise) to which other mechanical or electrical devices are attached. This feature would be used in the event that such mechanical or electrical devices were required in the interior of the container, which because of the nature of the mechanical or electrical devices or the action of the materials within the container upon them must be removed from the interior of the container for service or replacement. The rod holding the plate to which these devices are fastened can be rotated 180° thus bringing these devices to the exterior of the container for service or replacement.

Specific examples of the best practices of the invention include the following:

(1) Provide a safe "window" in a container to allow visual inspection of the interior of the container to:

(a) Observe the operation within the container.

(b) Observe the level of the material within the container.

(c) Observe the condition of the material within the container.

(d) Introduce light or other rays into the container to affect the materials in the container or vice versa.

(e) allow the cleaning of the interior, or underside, of the transparent plate from the exterior of the container without loss of materials.

(f) Provide a method of introducing, or removing, a material from the containers.

(g) Provide a means of stopping the flow of material from the container in the event of breakage or rupture of the transparent plate.

(h) Allow access to the interior of any container, under pressure, for any reason.

(2) Provide a platform to which mechanical or electrical devices can be fastened and introduced into the interior of the container to:

(a) Sense pressures, temperatures, etc. and relay same to the exterior of the container via pipes, tubes, wires or rays or combinations of same. The relay media can be be disconnected, capped and rotated 180° so that the interior sensing devices can be serviced or replaced from the exterior of the container.

(b) Remove or introduce materials to the container in devices attached to the rotating plate. These devices can open and close automatically or be actuated by levers, rods, and impulses (electric, etc.) operated through the rotating plate.

The device is useful as a window or port on a submarine or on a space vehicle, which can be closed off when not in use or at particularly hazardous times, such as in launching, re-entry, or in radiation belts. In large size it is useful as a lock to be used by a man entering or exiting a space craft or the like.

In the modification of the invention shown in FIGS. 8–11, the body 50 has, in addition to the principal longitudinal cylindrical passageway 51, a side passageway 52 at right angles to the principal passageway, that is, this form of the invention is based on a three-way T-type of plug valve construction. The outer end of the side passageway 52 is normally closed off by a removable cap 52a threaded into such opening. With the rotatable plug 53 in the initial or "open" position shown in FIGS. 8, 9 and 10, a clear line of sight is afforded through the port 54 of the plug and the longitudinal passageway 51 into a vessel (not shown) attached at a flange 55 of the device in the usual manner. The port 54 is sealed by a transverse glass 56 or the like maintained in place within the port by a retaining ring 57. Turning the rotatable plug 53 90° to the position shown in FIG. 11 seals off the device from the interior of the vessel and at the same time presents the port 54 and the glass 56 therein to access at the side passageway 52. It is then a simple matter (after unscrewing the cap 52a) to change the glass if desired (by removing the retaining ring 57) all without disturbing or interrupting the contents or operation of the vessel in any way. As in the principal form of the invention, cleaning of the interior of the glass in this modification may be accomplished by turning the plug a full 180° from the FIG. 8 position to a new position (not shown) in which the former inside face of the glass now faces outwardly and is accessible from the outer opening 58 of the device.

Having thus described my invention, what I claim and desire to protect by Letters Patent is:

1. A sight glass assembly comprising a plug valve having:
   (A) a body portion adapted to be attached to a vessel at an opening thereof for the purpose of looking into the vessel through the sight glass while preserving a fluid-sealed condition within the vessel;
   (B) said body portion having a longitudinal passageway extending therethrough which is in alignment with the said opening when the assembly is attached to the vessel;
   (C) a plug rotatably mounted in said body transversely of said passageway, said plug being in fluid-sealed relationship with said body when in a static position;
   (D) said plug having a transverse port therethrough which is in alignment with and in communication with said passageway when said plug is disposed in an "open" position and which is transverse to the passageway and sealed off from the passageway when the plug is rotated 90° in either direction from said "open" position to a "closed" position, and
   (E) a sight glass mounted transversely within the port of said plug sealing off said port while permitting sight therethrough.

2. A sight glass assembly as in claim 1 in which the said body has on one side an additional passageway extending transversely from the outside of the body to said longitudinal passageway, said additional passageway being in alignment with said port and giving access to said sight glass when the plug is rotated to a "closed" position, and said additional passageway being sealed off from the longitudinal passageway by the plug when the plug is in an "open" position.

3. A sight glass assembly as in claim 1 in which the sight glass is removably mounted in said port.

4. A sight glass assembly as in claim 2 in which the sight glass is removably mounted in said port.

References Cited
UNITED STATES PATENTS

| | | | |
|---|---|---|---|
| 2,250,124 | 7/1941 | Carter | 137—559 X |
| 3,085,464 | 4/1963 | Touray | 49—171 |
| 3,331,959 | 7/1967 | Sayre et al. | 137—559 X |

LOUIS R. PRINCE, Primary Examiner

D. M. YASICH, Assistant Examiner

U.S. Cl. X.R.

137—559